United States Patent
Wang

(10) Patent No.: US 8,996,704 B2
(45) Date of Patent: Mar. 31, 2015

(54) METHOD AND SYSTEM FOR CONNECTING CLIENTS WITH SERVER

(75) Inventor: Zhihong Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 199 days.

(21) Appl. No.: 13/609,988

(22) Filed: Sep. 11, 2012

(65) Prior Publication Data

US 2013/0246634 A1    Sep. 19, 2013

(30) Foreign Application Priority Data

Oct. 8, 2011 (CN) .......................... 2011 1 0301644

(51) Int. Cl.
H04L 29/06 (2006.01)
H04L 29/08 (2006.01)

(52) U.S. Cl.
CPC ............ *H04L 65/1069* (2013.01); *H04L 67/14* (2013.01)
USPC ............ 709/227; 709/228; 709/229; 709/235

(58) Field of Classification Search
None
See application file for complete search history.

(56) References Cited

U.S. PATENT DOCUMENTS

| | | | |
|---|---|---|---|
| 2002/0198923 A1* | 12/2002 | Hayes, Jr. ...................... | 709/102 |
| 2007/0002789 A1* | 1/2007 | Zhang ............................ | 370/328 |
| 2010/0180037 A1* | 7/2010 | Dessart ......................... | 709/227 |
| 2013/0054818 A1* | 2/2013 | Furuta et al. .................. | 709/227 |

* cited by examiner

*Primary Examiner* — Chris Parry
*Assistant Examiner* — Caroline Jahnige
(74) *Attorney, Agent, or Firm* — Brinks Gilson & Lione

(57) ABSTRACT

The present invention discloses a method for connecting clients with a server. The method includes: the client obtains random number seed information; the client calculates out a random delay time according to the random number seed information and a random function after the client is disconnected from the server, wherein the random delay time is a delay time for reconnection between the client and the server; and the client sends a connection request to the server upon expiry of the random delay time. Therefore, when the server is restarted or breaks down, each client delays the connection according to the random delay time calculated by them respectively, thereby preventing plenty of clients from requesting to connect to the server simultaneously and avoiding service interruption of the server.

11 Claims, 3 Drawing Sheets

METHOD AND SYSTEM FOR CONNECTING CLIENTS WITH SERVER

CROSS-REFERENCE TO RELATED APPLICATIONS

This application claims priority to Chinese Patent Application No. 201110301644.0, filed on Oct. 8, 2011, entitled "Method For Connecting Clients With Server, And System, Client, Server", which is incorporated herein by reference in its entirety.

FIELD OF THE TECHNOLOGY

The present invention relates to the field of communication technologies, and in particular, to a method and system for connecting clients with a server.

BACKGROUND OF THE INVENTION

In the computer field, plenty of clients and server system structures exist. One or more clients or even massive clients are connected to a server to interact with the server and obtain services so as to meet requirements of the clients.

Currently, with growth of services, one server may serve tens of thousands of, or even over a million clients simultaneously, and usually needs to handle connection requests from the clients continuously. When a server is abnormal, for example, restarted or broken down, the disconnected clients will request to reconnect to the server immediately so that the clients can get connected as soon as practicable.

However, the total connection capability of each server is fixed under certain conditions. Although the connection capability may be improved through optimization, the connection capability still has a reasonable upper limit, namely, maximum connection capability. Meanwhile, each server's capability of handling access per second is also fixed under certain conditions, and has a reasonable value, namely, connection processing rate. Obviously, the maximum connection capability is far greater than the connection processing rate. Once a server is restarted or breaks down, with plenty of clients requesting to reconnect immediately, the server may reach or exceed its maximum connection capability, and the connection processing rate of the server is unable to handle so many connections simultaneously, which gives rise to surge requests.

A surge means that many clients request services from a server concurrently, with the rate of the concurrent requests being greater than the processing capability of the server. When the number of connection requests of the clients in a unit time exceeds the processing capability of the server, the part of connection requests beyond the processing capability will not be satisfied normally.

To cope with such circumstances, a corresponding reconnection mechanism exists on the client. Once a client fails in connecting, the client sends new connection requests to the server again. Consequently, the connection requests increase exponentially, which reduces the quality of service or even interrupts the service and brings disastrous consequences.

SUMMARY OF THE INVENTION

Embodiments of the present invention provide a method for connecting a client with a server, and a system, a client, and a server to prevent surge requests, namely, avoid unavailability or service interruption of the server.

A method for connecting a client with a server includes:

obtaining, by the client, random number seed information;

calculating, by the client, a random delay time according to the random number seed information and a random function after the client is disconnected from the server, where the random delay time is a delay time for reconnection between the client and the server; and sending, by the client, a connection request to the server upon expiry of the random delay time.

A system for handling connections between a client and a server includes:

a client and a server, where the client is configured to: obtain random number seed information; calculate a random delay time according to the random number seed information and a random function after the client is disconnected from the server, where the random delay time is a delay time for reconnection between the client and the server; and send a connection request to the server upon expiry of the random delay time; and the server is configured to generate random number seed information and send the random number seed information to the client.

A client includes:

an obtaining unit, configured to obtain random number seed information;

a calculating unit, configured to calculate a random delay time according to the random number seed information and a random function, where the random delay time is a delay time for reconnection between the client and a server; and a requesting unit, configured to send a connection request to the server upon expiry of the random delay time.

A server includes:

an information generating unit, configured to generate random number seed information; and a sending unit, configured to send the random number seed information to a client.

Embodiments of the present invention bring the following benefits: when a server is restarted abnormally or breaks down, each client calculates a random delay time for reconnection to the server according to obtained random number seed information and a random function, and reattempts the connection respectively upon expiry of the random delay time, thereby preventing massive clients from requesting to connect to the server simultaneously. All clients reattempt the connection within the processing capability of the server, thereby ensuring stable and reliable operation of the server.

BRIEF DESCRIPTION OF THE DRAWINGS

FIG. 1 is a schematic flowchart of connecting a client with a server according to an embodiment of the present invention;

FIG. 2 is a schematic flowchart of connecting a client with a server according to another embodiment of the present invention;

FIG. 3 is a schematic flowchart of connecting a client with a server according to still another embodiment of the present invention;

FIG. 4 is a schematic structural diagram of a system for handling connections between a client and a server according to an embodiment of the present invention;

FIG. 5 is a schematic diagram of a logical structure of a client according to an embodiment of the present invention; and FIG. 6 is a schematic diagram of a logical structure of a server according to an embodiment of the present invention.

DETAILED DESCRIPTION OF THE EMBODIMENTS

Embodiments of the present invention provide a method for connecting a client with a server, and a system, a client, and a server to prevent reconnection requests of clients from exceeding the processing capability of a server when the server is restarted or breaks down and to avoid unavailability or service interruption of the server.

The following describes embodiments of the present invention in detail.

Figure 1:
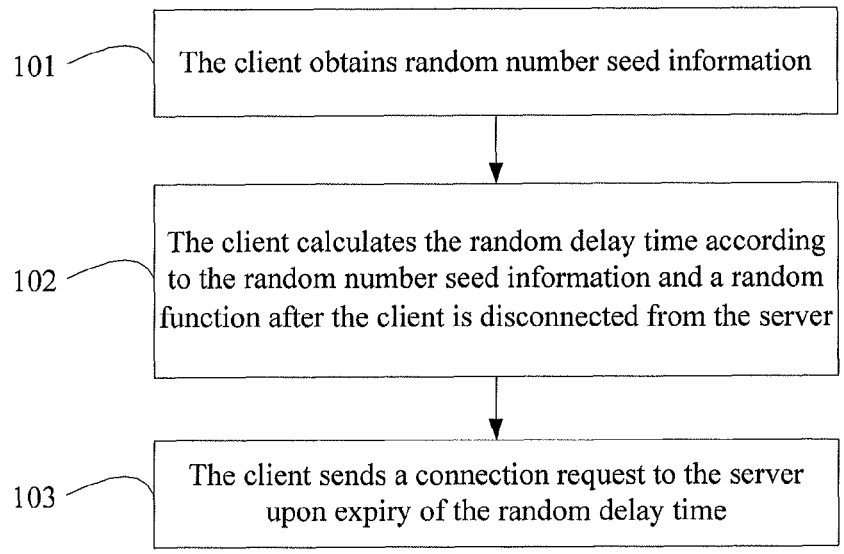

As shown in FIG. 1, a method for connecting a client with a server according to an embodiment of the present invention includes the following steps:

Step 101. The client obtains random number seed information.

The client may be any type of computer terminal connected with a server. The server may be a web system server, a cloud service system server, a cloud storage server, or a cloud anti-virus system server. The random number seed information is information that includes a random number seed. The random number seed is a delay random number seed for calculating a random delay time.

Step 102. The client calculates the random delay time according to the random number seed information and a random function after the client is disconnected from the server.

When the server breaks down or is restarted, the client is disconnected from the server, and the client inputs the random number seed into the random function to calculate a random number. The value of the random number is the random delay time.

Step 103. The client sends a connection request to the server upon expiry of the random delay time.

After clients are disconnected from the server, all clients do not request to reconnect to the server immediately or simultaneously, but send a connection request to the server respectively upon expiry of their respective random delay time.

In this embodiment, when a server is restarted abnormally or breaks down, each client calculates a random delay time for reconnection to the server according to obtained random number seed information and a random function, and reattempts the connection respectively upon expiry of the random delay time, thereby preventing massive clients from requesting to connect to the server simultaneously.

Figure 2:
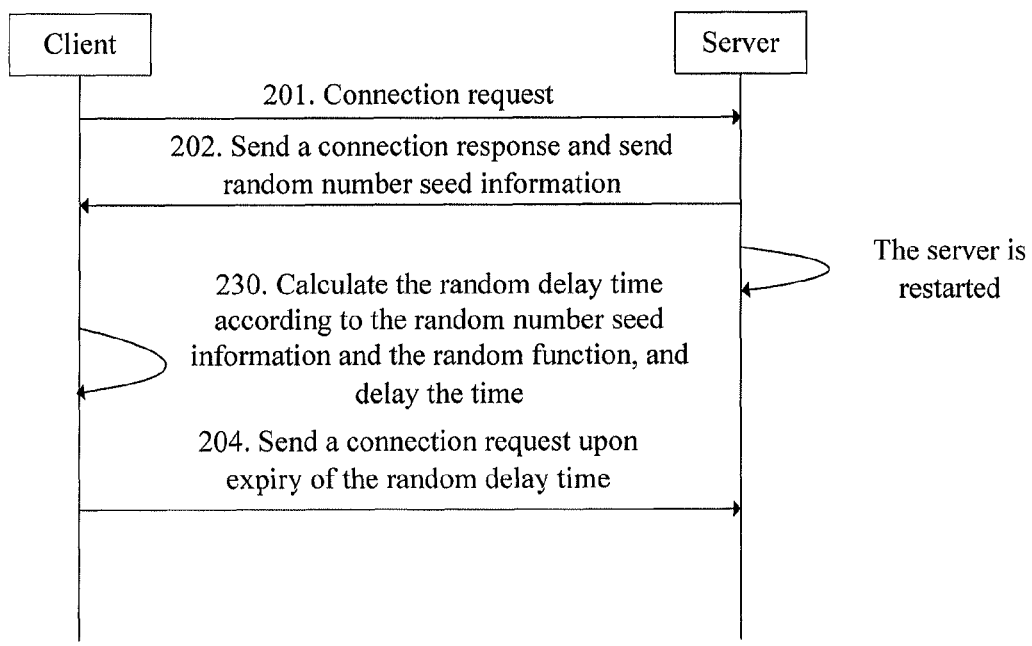

As shown in FIG. 2, a method for connecting a client with a server according to an embodiment of the present invention includes the following steps:

Step 201. The client sends a connection request to a server.

Step 202. The server returns a connection response and sends random number seed information to the client, and the client obtains the random number seed information from the server.

To prevent occurrence of surge requests after the client is connected with the server for the first time, the server sends the random number seed information to the client when the client sends the connection request to the server for the first time. For the definition of the connection request sent by the client to the server and the definition of the connection response sent by the server, see Table 1 and Table 2 respectively.

TABLE 1

Definition of connection request message

| Field | Length | Value |
| --- | --- | --- |
| Message length | 1B | Length of the whole message body |
| Command word | 1B | |

TABLE 2

Definition of connection response message

| Field | Length | Value |
| --- | --- | --- |
| Message length | 1B | Length of the whole message body |
| Command word | 1B | |
| Random number seed information | 1B | Value (N) of the random number seed information |

Step 203. The client calculates a random delay time according to the random number seed information and a random function after the server is restarted, where the random delay time is a delay time for reconnection between the client and the server.

The random number seed information is:

Random number seed information=(number of all client connections bearable by the server/number of client connections bearable by the server per second)*adjustment factor.

The adjustment factor is a coefficient for adjusting the size of the random number seed. If the required random delay time is long, increase the coefficient; if the required random delay time is short, decrease the coefficient.

The client calculates the random delay time according to the random number seed information and the random function, and the detailed process is as follows:

Input the random number seed information into a random function, and calculate a random number. The random number is the random delay time. For example, the random function is Srand ( ). Run Srand (random number seed information) to obtain the random delay time. The random number seed information input into the function Srand ( ) is a random number seed. Because the random number seed needs to be an integer, the value of the random number seed information is rounded to an integer in the following way:

Adding 1 to the last digit of the integer: Remove the digits in the decimal part of the value of the random number seed information, and add 1 to the last digit of the integer; or Removing the decimal part: Remove the decimal part of the value of the random number seed information; or Rounding off into an integer. For example:

Random number seed information=Round ((number of all client connections bearable by the server/number of client connections bearable by the server per second)*adjustment factor).

Round ( ) is a rounding function.

If the value of the random number seed information is N, where N is a numerical value greater than 0, the value range of the calculated random number is 0–N. That is, the range of the random delay time is 0–N seconds.

The following gives more details through an example.

If the number of all client connections bearable by the server is 1,000,000, and the number of client connections bearable by the server per second is 1,000, and the adjustment factor is 1, (1,000,000/1,000)*1=1,000.

The value 1000 calculated through the foregoing formula is the random number seed information. The foregoing formula indicates that all clients can finish connecting to the server within 1000 seconds. The random number seed information is a random number seed.

The server sends the random number seed information 1000 to the client. Each client inputs the random number seed information 1000 into the random function Srand( ) to calculate a random number. The random number is the random delay time.

After a client is disconnected from the server, if the random number calculated by the client is 0, the random delay time is 0 second, and the client gets connected to the server immediately; if the random number calculated by the client is 10, the random delay time is 10 seconds, and the client gets connected to the server after a delay of 10 seconds. The value range of the random number calculated by each client is 0-1,000. That is, the random delay time is 0-1,000 seconds.

Step 204. The client sends a connection request to the server upon expiry of the random delay time.

If the value of the calculated random delay time is 0, the client gets connected to the server immediately; if the value of the delay time of the client is N, the client waits for N seconds and then gets connected to the server again. Therefore, the method in the embodiments of the present invention reduces the number of clients sending connection requests to the server in a unit time, and ensures the connection requests of the clients to fall within the connection processing capability of the server.

The method of calculating the random number seed information in this embodiment is simple and effective, and it is easy for the client to calculate the random delay time according to the random number seed information and the random function. Besides, because the calculated random number seldom repeats itself, the random delay time varies between the clients, and it is avoided that massive clients send requests to the server simultaneously.

Understandably, the client not only may obtain the random number seed information from the server, but may also configure the random number seed information by itself.

Figure 3:
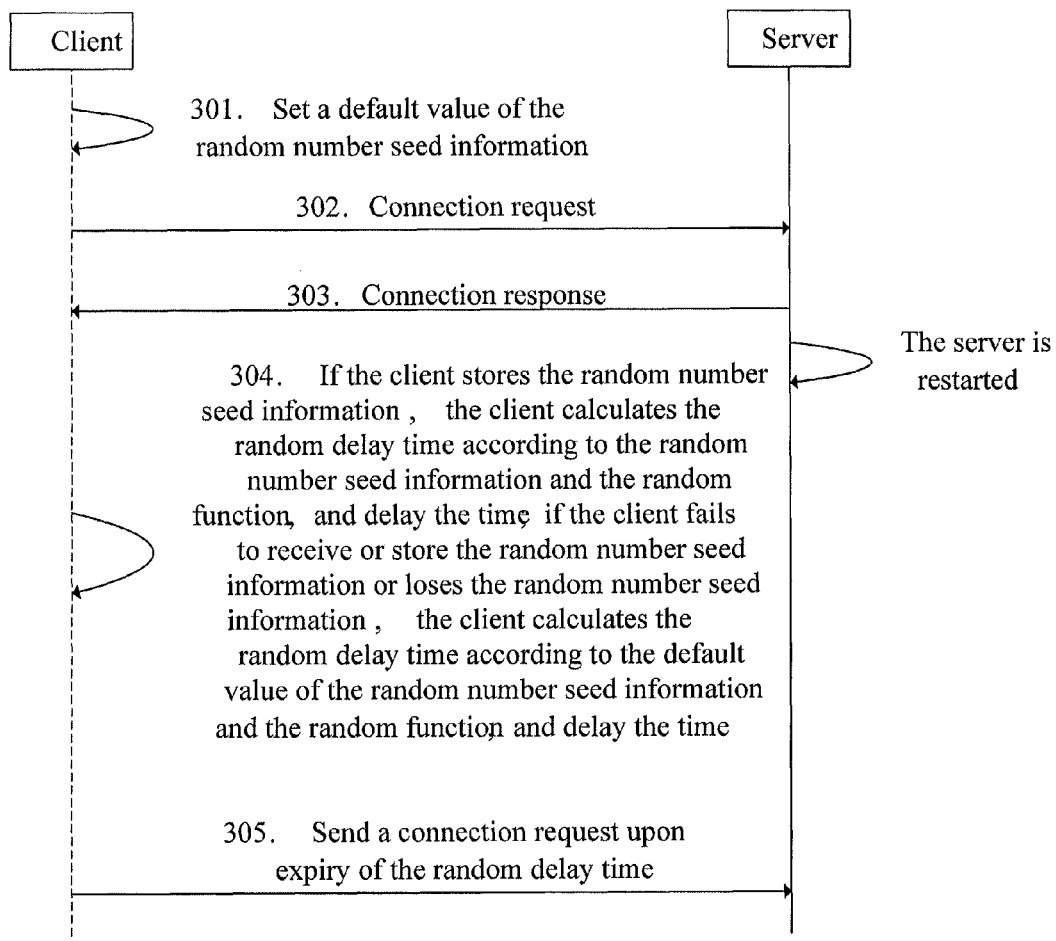

To handle the possibilities that the client may fail to receive or save the random number seed or may lose the random number seed, a default value of the random number seed may be set on the client. As shown in FIG. 3, the details are as follows:

Step 301: Before obtaining the random number seed information, a client obtains a default value of the random number seed information.

Step 302: The client sends a connection request to a server.

Step 303: The server sends a connection response to the client.

Step 304. After the server is restarted, if the client stores the random number seed information, the client calculates a random delay time according to the random number seed information and the random function, where the random delay time is a delay time for reconnection between the client and the server, and then the client waits for the delay time; if the client fails to receive or store the random number seed information or loses the random number seed information, the client calculates a random delay time according to the default value of the random number seed information and the random function, where the random delay time is a delay time for reconnection between the client and the server, and then the client waits for the delay time.

Step 305. The client sends a connection request to the server upon expiry of the random delay time.

In this embodiment, the client sets a default of the random number seed to ensure that the client can still obtain the random delay time when the client fails to receive or store the random number seed information or loses the random number seed information.

If the connection processing capability of the server is improved, the random delay time of the client may be adjusted, and the random number seed information of the client may need to be modified. The new random number seed information may be obtained by the client from the server or set by the client itself. If the random number seed information obtained by the client is new, the client needs to update the stored random number seed information.

Figure 4:
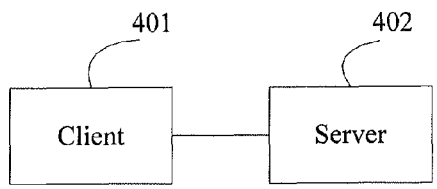

The following describes a system for handling connections between a client and a server. As shown in FIG. 4, the system includes a client and a server.

Client 401 is configured to: obtain random number seed information; calculate a random delay time according to the random number seed information and a random function after it is disconnected from the server 402, wherein the random delay time is a delay time for reconnection between the client 401 and the server 402; and send a connection request to the server 402 upon expiry of the random delay time; and The server 402 is configured to generate random number seed information and send the random number seed information to the client 401.

A message interface is set between the server 402 and the client 401. Through the message interface, the server 402 sends the random number seed information to the client 401.

Figure 5:
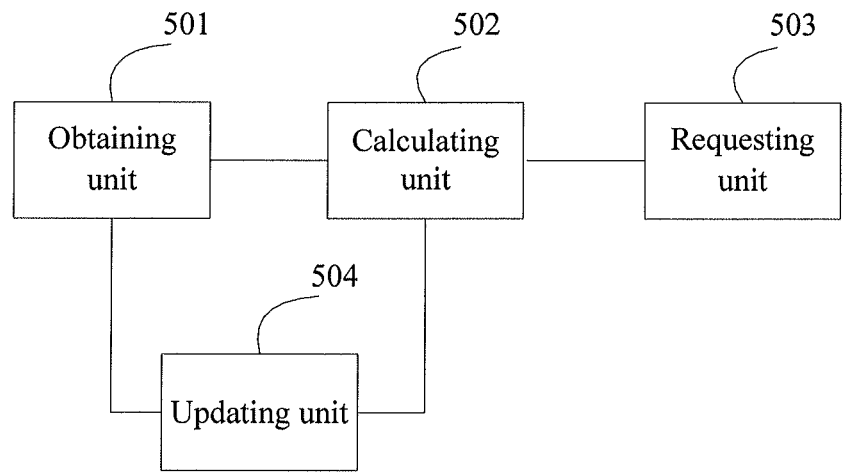

The following describes the client. As shown in FIG. 5, the client includes:

an obtaining unit 501, configured to obtain random number seed information;

a calculating unit 502, configured to calculate a random delay time according to the random number seed information and a random function, where the random delay time is a delay time for reconnection between the client and a server; and a requesting unit 503, configured to send a connection request to the server upon expiry of the random delay time.

The running processes of the above units are as follows:

the obtaining unit 501 obtains the random number seed information sent by the server, or obtains the random number seed information configured by a user.

After the client is disconnected from the server, the calculating unit 502 invokes the random number seed information and inputs it into a random function to calculate a random number. The random number is a random delay time.

After the client is disconnected from the server, the requesting unit 503 does not send a connection request to the server immediately, but sends a connection request to the server upon expiry of the random delay time calculated by the calculating unit 502.

Besides, the obtaining unit 501 may obtain a default value of the random number seed information, where the default value is sent by the server or configured by the user. In the case that the client fails to receive or store the random number seed information or loses the random number seed information, the calculating unit 502 uses the default value to calculate the delay time.

It should be pointed out that the client further includes an updating unit 504, which is configured to update the random number seed information.

After the obtaining unit 501 obtains new random number seed information, if the client stores the random number seed information, the updating unit 504 updates the random number seed information, and the calculating unit 502 invokes the updated random number seed information.

All network terminals that meet the foregoing conditions may act as the clients of the present invention, for example, PC, and mobile phones based on various operating systems.

Figure 6:
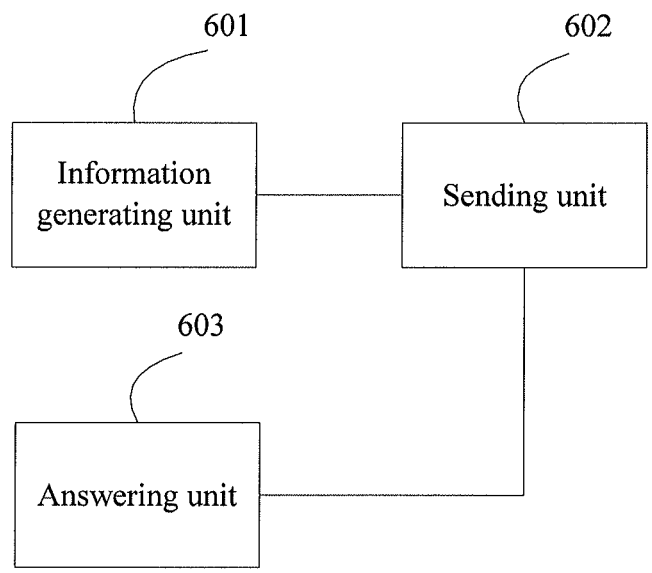

The following describes the server. As shown in FIG. 6, the server includes:

an information generating unit 601, configured to generate random number seed information; and a sending unit 602, configured to send the random number seed information to a client.

The server further includes an answering unit 603, which is configured to answer the client's request for obtaining the random number seed information.

The information generating unit 601 generates the random number seed information according to:

Random number seed information=(number of all client connections bearable by the server/number of client connections bearable by the server per second)*adjustment factor.

The adjustment factor is a coefficient for adjusting the size of the random number seed.

When the answering unit 603 answers the client's request for obtaining the random number seed information, the sending unit 602 sends the random number seed information generated by the information generating unit 601 to the client.

The clients in the embodiments of the present invention include but are not limited to various computer terminals, and the server that serves the clients may be a web system server, a cloud service system server, a cloud antivirus system server, or a cloud storage server.

The text above is a detailed description about a method for connecting a client with a server, and a system, a client, and a server according to the embodiments of the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for connecting a client with a server, comprising:
    obtaining, by the client, random number seed information;
    calculating, by the client, a random delay time according to the random number seed information and a random function after the client is disconnected from the server, wherein the random delay time is a delay time for reconnection between the client and the server; and
    sending, by the client, a connection request to the server upon expiry of the random delay time, wherein the connection request is used for requesting to reconnect to the server;
    wherein the random number seed information=(number of all client connections bearable by the server/number of client connections bearable by the server per second) *adjustment factor, wherein
    the adjustment factor is a coefficient for adjusting size of a random number seed.

2. The method for connecting a client with a server according to claim 1, wherein:
    the random number seed information is obtained by the client from the server or configured by the client itself.

3. The method for connecting a client with a server according to claim 1, wherein:
    after the client obtains the random number seed information, the method further comprises:
    updating the random number seed information stored in the client if the random number seed information obtained by the client is new.

4. The method for connecting a client with a server according to claim 3, wherein:
    the new random number seed information is obtained by the client from the server or configured by the client itself.

5. The method for connecting a client with a server according to claim 1, wherein:
    before obtaining the random number seed information, the client obtains a default value of the random number seed information.

6. The method for connecting a client with a server according to claim 5, wherein:
    if the client stores the random number seed information, the client calculates the random delay time according to the random number seed information and the random function, wherein the random delay time is the delay time for reconnection between the client and the server; and
    if the client fails to receive or store the random number seed information or loses the random number seed information, the client calculates the random delay time according to the default value of the random number seed information and the random function, wherein the random delay time is the delay time for reconnection between the client and the server.

7. A system for handling connections between a client and a server, comprising the client and the server, wherein:
    the client is configured to: obtain random number seed information; calculate a random delay time according to the random number seed information and a random function after the client is disconnected from the server, wherein the random delay time is a delay time for reconnection between the client and the server; and send a connection request to the server upon expiry of the random delay time, wherein the connection request is used for requesting to reconnect to the server; and
    the server is configured to generate the random number seed information and send the random number seed information to the client;
    wherein the random number seed information=(number of all client connections bearable by the server/number of client connections bearable by the server per second) *adjustment factor, wherein
    the adjustment factor is a coefficient for adjusting size of a random number seed.

8. A client, comprising a processor and a non-transitory processor-readable medium having processor-executable instructions stored thereon, wherein, the processor is configured to comprising:
    an obtaining unit, configured to obtain random number seed information;
    a calculating unit, configured to calculate a random delay time according to the random number seed information and a random function, wherein the random delay time is a delay time for reconnection between the client and a server; and
    a requesting unit, configured to send a connection request to the server upon expiry of the random delay time, wherein the connection request is used for requesting to reconnect to the server;
    wherein the random number seed information=(number of all client connections bearable by the server/number of client connections bearable by the server per second) *adjustment factor, wherein
    the adjustment factor is a coefficient for adjusting size of a random number seed.

9. The client according to claim 8, wherein the processor is further configured to comprising:
    an updating unit, configured to update the random number seed information.

10. A server, comprising a processor and a non-transitory processor-readable medium having processor-executable instructions stored thereon, wherein, the processor is configured to:

an information generating unit, configured to generate random number seed information; and a sending unit, configured to send the random number seed information to a client; wherein the random number seed information is a delay random number seed for calculating a random delay time after the client is disconnected from the server, and the random delay time is a delay time for reconnection between the client and the server; and receive a connection request sent by the client upon expiry of the random delay time, wherein the connection request is used for requesting to reconnect to the server;

wherein the random number seed information=(number of all client connections bearable by the server/number of client connections bearable by the server per second) *adjustment factor, wherein the adjustment factor is a coefficient for adjusting size of a random number seed.

11. The server according to claim 10, wherein the processor is further configured to further comprising:

an answering unit, configured to answer the client's request for obtaining the random number seed information.

\* \* \* \* \*